(12) United States Patent
Pedersen et al.

(10) Patent No.: US 8,814,187 B2
(45) Date of Patent: Aug. 26, 2014

(54) TRANSVERSE LINK, AND METHOD FOR PRODUCING A TRANSVERSE LINK

(75) Inventors: Roald Pedersen, Gjovik (NO); Stephan Meyer, Bielefeld (DE); Vitalis Rudi, Paderborn (DE); Dirk Vogler, Delbrück (DE); Odd Perry Sovik, Kolbu (NO)

(73) Assignee: Benteler Automobiltechnik GmbH, Paderborn (DE)

( * ) Notice: Subject to any disclaimer, the term of this patent is extended or adjusted under 35 U.S.C. 154(b) by 111 days.

(21) Appl. No.: 13/301,150

(22) Filed: Nov. 21, 2011

(65) Prior Publication Data

US 2012/0299264 A1    Nov. 29, 2012

(30) Foreign Application Priority Data

Nov. 22, 2010   (DE) .......................... 10 2010 051 884

(51) Int. Cl.
*B60G 7/00*    (2006.01)
*B23P 15/00*   (2006.01)

(52) U.S. Cl.
CPC .......... *B60G 7/001* (2013.01); *B60G 2206/121* (2013.01); *B60G 2206/82* (2013.01); *B60G 2206/811* (2013.01); *B60G 2206/8103* (2013.01)
USPC ................................... 280/124.134; 29/897.2

(58) Field of Classification Search
CPC ............. B60G 7/001; B60G 2206/121; B60G 2206/82; B60G 2206/811; B60G 2206/8103
USPC .......................... 280/124.134, 124.109, 785; 296/193.02, 205; 29/897.2, 447; 72/253.1, 260, 254
See application file for complete search history.

(56) References Cited

U.S. PATENT DOCUMENTS 7,261,307 B2 *  8/2007  Nuno et al. ............ 280/124.151
7,850,182 B2 * 12/2010  Jang et al. ............. 280/124.134

FOREIGN PATENT DOCUMENTS

| DE | 102006011107 | 7/2007 |
| EP | 1 336 514 A2 | 8/2003 |
| EP | 1 642 754 | 4/2006 |
| WO | WO 2008 082305 A1 | 7/2008 |

* cited by examiner

*Primary Examiner* — Paul N Dickson
*Assistant Examiner* — Joselynn Y Sliteris
(74) *Attorney, Agent, or Firm* — Henry M Feiereisen LLC

(57) ABSTRACT

In a method of producing a transverse link for arrangement on a motor vehicle axle, a semifinished product is produced from an extrusion profile of light metal with at least three hollow chambers in side-by-side relationship. A top side and a bottom side of a middle one of the chambers is trimmed at ends thereof so that outer ones of the chambers form bearing arms which project beyond a base body. The middle chamber is formed with flanges which are bent and coupled with the base body. The bearing arms are bent and mounts for attachment are formed.

15 Claims, 3 Drawing Sheets

TRANSVERSE LINK, AND METHOD FOR PRODUCING A TRANSVERSE LINK

CROSS-REFERENCES TO RELATED APPLICATIONS

This application claims the priority of German Patent Application, Serial No. 10 2010 051 884.0-21, filed Nov. 22, 2010, pursuant to 35 U.S.C. 119(a)-(d), the content of which is incorporated herein by reference in its entirety as if fully set forth herein.

BACKGROUND OF THE INVENTION

The present invention relates to a transverse link, and to a method for producing a transverse link.

The following discussion of related art is provided to assist the reader in understanding the advantages of the invention, and is not to be construed as an admission that this related art is prior art to this invention.

Axle components in the form of track rods, links, or twist beams transmit static and dynamic wheel forces to an axle subframe or to a motor vehicle body. These axle components are rotatably and/or pivotally coupled between wheel carriers and vehicle-side attachment points, with the coupling normally realized via rubber-metal bearings.

Wheel forces being transmitted have hereby peak zones of up to several thousand Newton. As a result, the wheel guide links have to withstand high and intense peak loads and constant vibratory stress. In addition, various influences during driving, for example uneven road surfaces or unbalances of one vehicle wheel, expose the wheel guide links to further substantial vibrations.

The demands on today's motor vehicles to comply with dynamic driving profiles render it important to use especially lightweight structures on the sides of the unsprung wheel masses. Moreover, automobile manufacturers always demand a reduction of the total vehicle weight so as to reduce fuel consumption and $CO_2$ emission.

Conventional links are normally made as steel components in order to meet the need for low weight, high stiffness, long life, and easy producibility. For example, multipart suspension links produced from steel are normally composed of an upper shell and a lower shell for attachment of various bearing mounts, spring mounts and also shock absorber mounts. Such a link is typically assembled by using welding for connections. This requires a number of operating steps and cumbersome anti-corrosive measures to provide a durable and robust component (cf. EP 1 336 514 A2).

The application of welding is disadvantageous because of the change in the hardness of the microstructure and of the heat impact zone surrounding the weld sea. In particular when geometrically complex components are involved, realization of a clean welding outcome is oftentimes difficult to attain. Another drawback of a welded steel construction is the resultant susceptibility to corrode. While the weld seams may enhance stiffness as a result of the coupling of various components to form a link, the addition of welding filler has the adverse effect of increasing weight.

Links may further be produced cost-effectively through primary-forming, for example casting. This allows implementation of links of, for example, X-shaped configuration. Casting renders the realization of geometrically complex shapes possible that cannot be achieved when a welded steel construction is involved. For example, links can be cast as hollow aluminum structures. Hollow spaces are normally realized by using expendable cores, e.g. sand cores or the like. Links made through casting are, however, disadvantageous, especially in the form of hollow components, because of the high production tolerance. The support of cores enclosed in the castings requires in some circumstances to leave the outer side open so that the torsional stiffness of such components is adversely affected. Another drawback of castings involves the high porosity of the component. This reduces strength compared to structures that have been produced by a forming process. The strength of castings is oftentimes enhanced by applying a subsequent forging process. The application of such a forging process increases production costs of the component however.

It would therefore be desirable and advantageous to address prior art shortcomings and to produce an improved link of high strength while yet having little weight and favorable producibility.

SUMMARY OF THE INVENTION

According to one aspect of the present invention, a method of producing a transverse link for arrangement on a motor vehicle axle, includes producing a semifinished product from an extrusion profile of light metal with at least three hollow chambers in side-by-side relationship, trimming a top side and a bottom side of a middle one of the chambers at ends thereof so that outer ones of the chambers form bearing arms which project beyond a base body, with the middle chamber being formed with flanges which are bent and coupled with the base body, bending the bearing arms, and forming mounts for attachment.

A method according to the present invention is especially suitable for producing a four-point link having x-shaped configuration in its final shape. At first, a semifinished product is made from a light metal extrusion profile of predefined length. The extrusion profile is hereby cut to the predefined size. The extrusion profile has at least three adjacent hollow chambers, suitably in one plane to define two outer chambers and an inner (middle) chamber. Of course, the lightweight extrusion profile may have more than three chambers. Webs that separate the chambers have advantageously a same thickness. Examples of light metal include aluminum alloys or magnesium alloys.

The middle chamber of the extrusion profile has a top side and a bottom side. The top side and the bottom side are hereby defined by two legs respectively which connect the outer chambers with one another. The middle chamber is trimmed in a next step from each end, whereby portions of the top side and the bottom side are cut out from the ends inwards towards the center. After trimming away portions of the top side and the bottom side of the middle chamber, bearing arms are formed which project out from a base body which is formed predominantly by the middle chamber. The base body thus does not constitute a separate component but rather is an integral part of the single-piece transverse link being produced. The outer chambers may also be part of the base body jointly with the middle portion (chamber). Those parts of the outer chambers that extend out beyond the base body thus form the bearing arms.

The bearing arms are subsequently formed in a way to change their alignment with respect to a longitudinal orientation of the extrusion profile. Advantageously, the transverse link being produced has an X-shaped configuration. The bearing arms are thus bent outwards from their initial position. In a next step, mounts are formed at the ends of the bearing arms. These mounts may be used for receiving rubber-metal bearings, pivot bearings, suspension struts, shock absorbers, etc. Advantageously, the bearing arms are not only formed laterally but also twisted.

A transverse link produced by a method according to the present invention has a particularly high strength, is of small weight, and can be produced in a cost-efficient manner.

During trimming the ends of the top side and bottom side, flanges are formed on the top side and/or bottom side and subsequently bent and coupled with the base body. As a result, the middle chamber has a substantially closed hollow profile, resulting in an increase of torsional stiffness in the region of the base body. Coupling may be implemented through thermal joining, for example, through welding, through toxing, or also through clinching, bonding or other coupling processes. It is, for example, conceivable to form a flange on each of the top side and bottom side, and to bend the flanges towards one another for subsequent coupling with one another. This may be realized by overlapping the flanges or by placing the ends of the flanges upon one another. It is also possible within the scope of the invention to formfittingly connect the flanges or to formfittingly couple the respective flange to a top side or bottom side of the middle chamber in the base body.

According to another advantageous feature of the present invention, the flanges can be formed on the top side or bottom side and bent towards the bottom side or top side. As a result, a cutting tool is able to separate the region of the middle chamber to be severed from end to end from only one side and to produce the more complex cutting operation for making the flange on the other side.

According to another advantageous feature of the present invention, the flanges can be coupled with the top side or bottom side. Suitably, this is done by thermal joining.

According to another advantageous feature of the present invention, the flanges are formed with separation webs which extend from the top side to the bottom side. In other words, the separation webs of the chambers extend from the top side to the bottom side of the hollow profile. Suitably, the bent flanges are also coupled with the webs, advantageously through thermal joining. In this way, the middle chamber is completely closed as hollow profile and the torsional stiffness is enhanced in the region of the middle chamber or base body, thereby further increasing the overall torsional stiffness of the link. As a result, the wall thickness of the multi-chamber profile can be sized smaller, accompanied by a reduction in the overall weight of the structure.

According to another advantageous feature of the present invention, the middle chamber and/or base body can be shaped. In other words, the link and/or the bearing arms can be shaped in the region of the middle chamber and/or the base body in such a way as to be formed with dents or bulges. These dents or bulges may serve as relieving profiles, as stiffening profiles, or also expansion profiles.

A relieving profile diverts the stress pattern within the structure accordingly and increases service life of the transverse link. A stiffening profile increases in particular the bending stiffness of the transverse link, in particular the bending stiffness of the base body. An expansion profile assists in the formation of the bearing arms. When bending the bearing arms outwards during the forming process, the base body is maintained under tension, in particular in the region of the middle chamber. To prevent the stress from tearing the material, the material deforms passively by the forming process and is actively shaped so as to prevent a prestress of the material and thus a tearing of the material due to sustained vibrations.

Forming the region of the middle chamber predominantly affects the top and bottom sides of the middle chamber. Forming the entire base body affects in addition the respective outer chambers, in particular the respective outer side of the outer chambers.

According to another advantageous feature of the present invention, the bearing arms can be configured. For example, this involves welding of bearing eyes, a further shaping, e.g. flattening or trimming of the ends of the bearing arms. Furthermore, the bearing arms may be cut to size, i.e. the ends of the bearing arms may be trimmed.

The bearing arms may further be provided with through-passages, perforate mounts, or formed to have spring or shock absorber mounts. This ensures that the forming process of the base body and the bending of the bearing arms produce a rough transverse link which is especially true to size. Only thereafter the attachment points are provided on the wheel side and the body side to finish a transverse link of high precision and with slight production tolerance at the same time.

According to another aspect of the present invention, a transverse link for arrangement to a motor vehicle axle, is formed from a single-piece light metal member having plural hollow chambers and includes a base body defining a middle one of the hollow chambers, with the middle hollow chamber having a closed configuration, and bearing arms extending from the base body.

Advantageously, the transverse link is produced as a four-point link made of aluminum, and the multi-chamber profile of the metal member has at least three chambers.

The closed configuration of the middle chamber in the base body can be advantageously formed by bending and coupling the flanges with the base body. Such a base body combines advantages of a lightweight hollow section with a high section modulus with respect to torsion and bending.

According to another advantageous feature of the present invention, the base body may have a dent or a bulge in a top side and/or bottom side. Denting or bulging may be advantageously formed in the middle chamber. Of course, also the outer chambers may be configured with a dent or bulge on the top side or bottom side. As an alternative, the provision of a dent or bulge is conceivable which extends over the entire top side and/or entire bottom side. The webs which separate the chambers from one another may be formed therewith accordingly.

The presence of a dent and/or bulge has many advantages as far as production is concerned. A bulge improves the cross section geometry such that a particular high section modulus against torsion is produced. The torsional stiffness is about 1900 Nm per degree. In the case of a dent, the torsional stiffness is about 1200 Nm per degree. The presence of a dent positively affects formation of the base body, in particular the middle chamber. During forming, the presence of a dent but also of a bulge provides relieve to prevent the occurrence of stress or resultant stress tears on the top side or bottom side and to ensure that the structure is substantially stress-free after conclusion of the forming process. Furthermore, the dent or the bulge increases the respective bending stiffness of the structure.

According to another advantageous feature of the present invention, the base body may have a dent on at least an outer side. The dent may hereby be formed on the outer webs of the outer chambers. As a result, the stiffness of the base body is increased and thus of the entire transverse link, on one hand, and the bearing arms can be formed more easily because of the presence of the dent, on the other hand. The dent also reduces stress within the structure.

According to another advantageous feature of the present invention, the top side and/or the bottom side of the middle chamber can be disposed in offset arrangement to at least a top side and/or bottom side of an outer one of the hollow chambers. The offset arrangement can be realized by a lower top side and/or bottom side of the middle chamber in relation to the top side and/or bottom side of the outer chambers. This results in an additional stiffening portion and has a positive effect with respect to the section modulus of the bending.

According to another advantageous feature of the present invention, at least one outer chamber may have in cross section a rounded configuration. This also has a positive effect on the section modulus with respect to bending and/or torsion, when considering the own weight of the produced transverse link.

According to another advantageous feature of the present invention, a relieving profile can be formed in a transition zone from the base body to the bearing arms. As a result, stress cracks during the production process of a transverse link or during extended use of the transverse link are prevented. The presence of relieving profiles avoids sharp-edges transitions from base body to bearing arm so as to realize a stress diversion to thereby prevent the presence of stress cracks.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
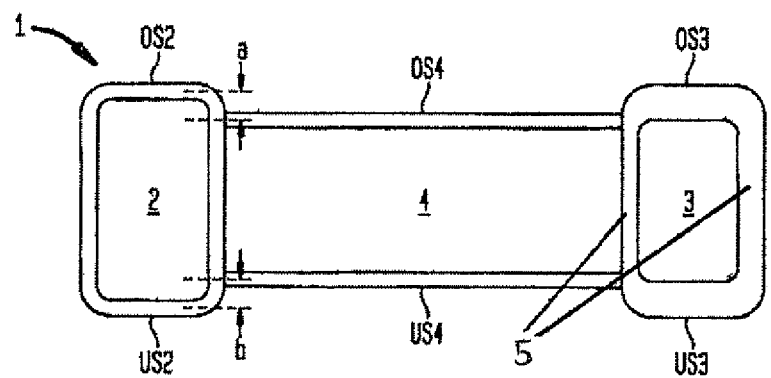
FIG. 1 is a cross sectional view of an extrusion profile for producing a transverse link according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a cross sectional view of an extrusion profile, generally designated by reference numeral 1 and having a left outer chamber 2, a right outer chamber 3, and a middle chamber 4. The chambers 2, 3, 4 have each a top side OS2, OS3, OS4 and a bottom side US2, US3, US4. The top side OS2, OS3, OS4 and the bottom side US2, US3, US4 of the respective chambers 2, 3, 4 are coupled with one another by vertical webs 5. The inner webs 5 separate hereby the middle chamber 4 from the right outer chamber 3 and the left outer chamber 2. The top side OS4 of the middle chamber 4 is inwardly offset at a distance a with respect to the top side OS2 of the left outer chamber 2 and the top side OS3 of the right outer chamber 3. The bottom side US4 of the middle chamber 4 is inwardly offset at a distance b with respect to the bottom side US2 of the left outer chamber 2 and the bottom side US3 of the right outer chamber 3.

Figure 2:
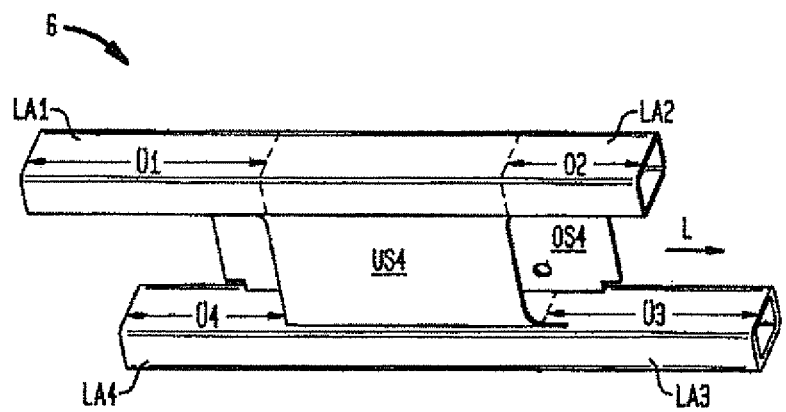
FIG. 2 is a bottom perspective view of a semifinished product after the extrusion profile undergoes a first method step.

FIG. 2 shows a bottom perspective view of a semifinished product 6 that has been cut from the extrusion profile 1. The semifinished product 6 has a first bearing arm LA1, a second bearing arm LA2, a third bearing arm LA3, and a fourth bearing arm LA4. Some parts of the bottom side US4 of the middle chamber 4 have already been trimmed away. Parts of the middle chamber 4 on the top side OS4 have also been trimmed away, with the top side OS4 being sized to extend beyond the bottom side US4 of the middle chamber 4 in longitudinal direction of the semifinished product 6. The respective bearing arms LA1, LA2, LA3, LA4 have overhangs Ü1, Ü2, Ü3, Ü4 which differ from one another. The varying overhangs Ü1, Ü2, Ü3, Ü4 conform to the later end configuration of a transverse link according to the present invention, illustrated in FIG. 5 and generally designated by reference numeral 9. In this way, waste is kept to a minimum, when shaping the semifinished product 6 into the transverse link 9.

Figure 3:
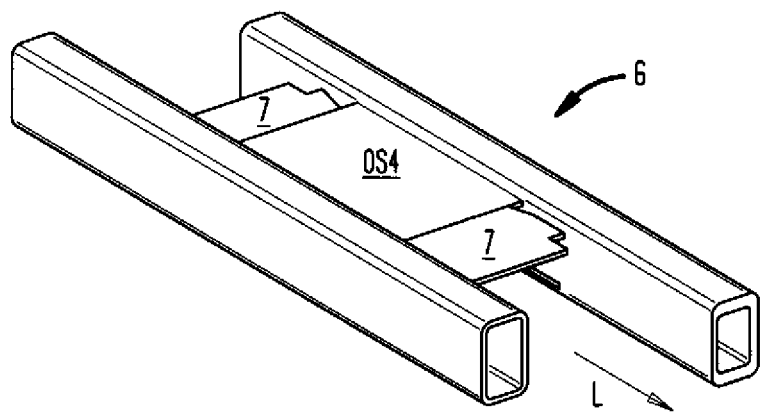
FIG. 3 is a top perspective view of the semifinished product after undergoing a further method step.

FIG. 3 illustrates a top perspective view of the semifinished product 6 after undergoing a further method step. The overhangs of the top side of the middle portion, as formed in longitudinal direction L of the semifinished product 6, are further trimmed to form flanges 7.

Figure 4:
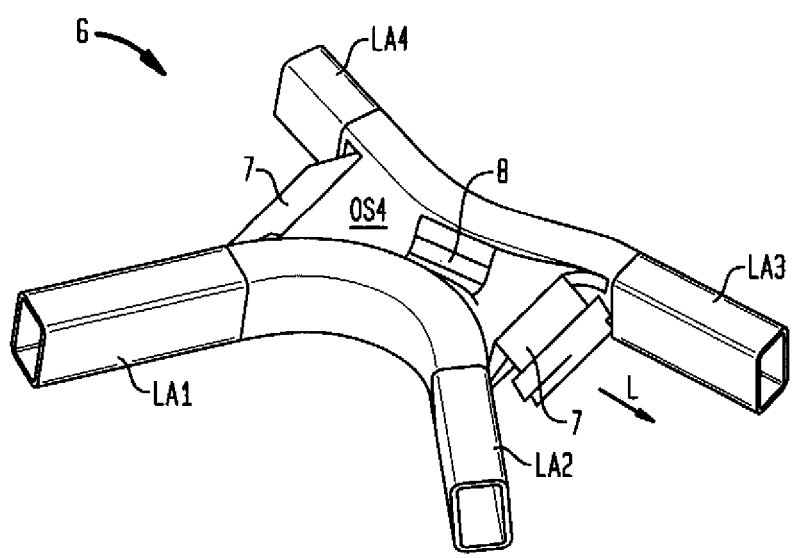
FIG. 4 is a top perspective view of the semifinished product after bending to form bearing arms.

FIG. 4 shows a top perspective view of the semifinished product 6 after undergoing another method step to produce the transverse link 9 by undergoing an outward bending with respect to the longitudinal direction L of the semifinished product 6 so as to form bearing arms LA1, LA2, LA3, LA4. A dent 8 is hereby formed on the top side OS4 and also, although not shown, on the bottom side of the middle chamber 4. Furthermore, the flanges 7 are bent in a direction towards the bottom side of the middle chamber 4.

Figure 5:
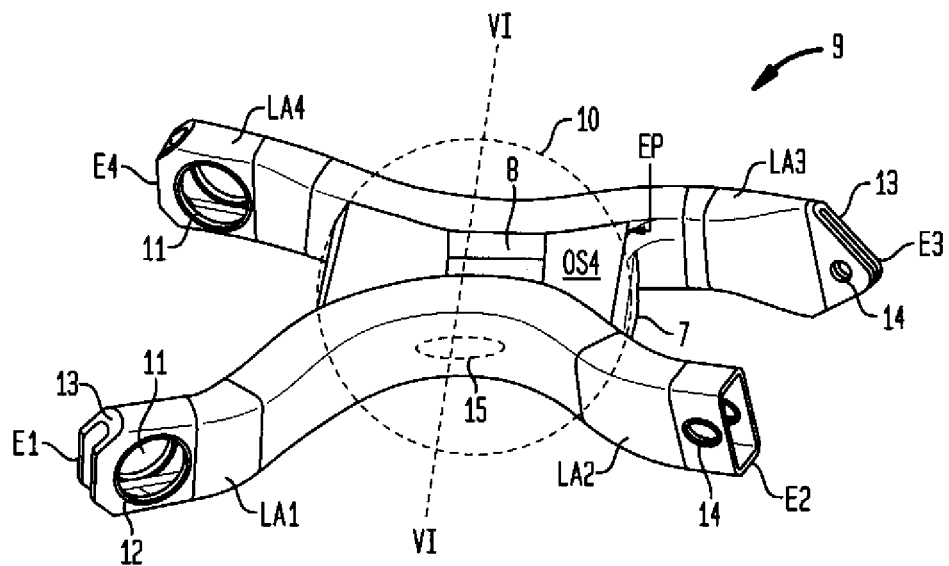
FIG. 5 is a side perspective view of a produced transverse link according to the present invention.

FIG. 5 shows a side perspective view of the produced transverse link 9 according to the present invention and clearly shows the formation of a base body 10 by the middle chamber 4 and sections of the outer chambers 2, 3. The bearing arms LA1, LA2, LA3, LA4 extend from the base body 10, with the bearing arms LA1 and LA 4 being provided with through-passages 11 for receiving rubber-metal bearings, not shown in greater detail. The though-passages 11 have webs 12 which are directed towards one another, as shown by way of example. The ends E1 and E4 are each provided with a bevel 13 for optimal use of installation space and removal of excess weight without compromising strength.

The bearing arm LA2 is provided with installation openings 14. This may involve also hybrid structures for example, whereby the installation openings 14 may be configured as steel eyelets in the region of the end E2 of bearing arm LA2. The end E3 of bearing arm LA3 is compressed and also provided with a bevel 13. Furthermore, the end E3 of bearing arm LA3 has an installation opening 14. FIG. 5 shows by way of example the provision of a depression 15 on the outer side of the left outer profile. Also shown on the top side OS4 of the middle chamber 4 is the dent 8, also shown in FIG. 4. The flanges 7 may additionally be coupled with the not shown bottom side of the middle chamber 4 by a material joint.

Moreover, a relieving profile EP is formed in a transition zone from the base body 10 to the bearing arm LA3.

Figure 6:
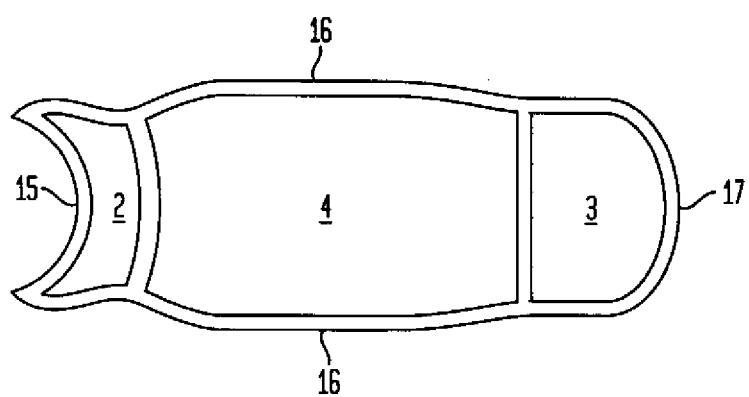
FIG. 6 is a cross sectional view of a base body in accordance with the present invention, taken along the line VI-VI in FIG. 5.

FIG. 6 is a cross sectional view of a base body 10 in accordance with the present invention, taken along the line VI-VI in FIG. 5. As can be seen, bulges 16 are formed in the middle chamber 4. The left chamber 2 is provided with a depression 15 at its outer web 5. The right outer chamber 3 has an outer side 17 having a rounded cross sectional configuration. Depending on the constructive design, any combination of bulge 16, depression 15 or rounded outwardly pointing or, though not shown, inwardly pointing cross sectional configuration may be conceivable.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A method of producing a transverse link for arrangement on a motor vehicle axle, comprising:
    producing a semifinished product from an extrusion profile of light metal with at least three hollow chambers in side-by-side relationship;
    trimming a top side and a bottom side of a middle one of the chambers at ends thereof so that outer ones of the chambers form bearing arms which project beyond a base body, with the middle chamber having, two vertical webs extending between the top and bottom sides, and two bent flanges provided at an end and at an opposite end of the middle hollow chamber, respectively, and coupled with the base body;
    bending the bearing arms; and
    forming mounts for attachment.

2. The method of claim 1, wherein the flanges are formed on at least one member selected from the group consisting of the top side and the bottom side of the middle hollow chamber, and bent toward the other member.

3. The method of claim 2, wherein the flanges are coupled with the vertical webs which extend from the top side of the middle hollow chamber to the bottom side of the middle hollow chamber.

4. The method of claim 1, wherein the flanges are coupled with a member selected from the group consisting of the top side of the middle hollow chamber and the bottom side of the middle hollow chamber.

5. The method of claim 4, wherein the flanges are coupled with the member by thermal joining.

6. The method of claim 1, further comprising shaping at least one member selected from the group consisting of the middle chamber and the base body.

7. The method of claim 1, wherein the bearing arms are bent outwards in relation to the base body.

8. The method of claim 1, further comprising configuring the bearing arms.

9. A transverse link for arrangement to a motor vehicle axle, said transverse link being formed from a single-piece light metal member comprising:
    a base body having plural hollow chambers and defining a middle one of the hollow chambers having a top side, a bottom side, two vertical webs extending between the top and bottom sides, and two bent flanges provided at an end and at an opposite end of the middle hollow chamber, respectively, with the middle hollow chamber having a closed configuration; and
    bearing arms extending from the base body.

10. The transverse link of claim 9, wherein the base body has a dent or a bulge in at least one member selected from the group consisting of a base body top side and a base body bottom side.

11. The transverse link of claim 9, wherein the base body has at least one outer side formed with a depression.

12. The transverse link of claim 9, wherein at least one member selected from the group consisting of the middle chamber top side and the middle chamber bottom side is disposed in offset arrangement to at least a top side and/or a bottom side of an outer one of the hollow chambers.

13. The transverse link of claim 9, wherein an outer one of the hollow chambers has an outer side which in cross section has a rounded configuration.

14. The transverse link of claim 9, wherein a transition zone from the base body to the bearing arms is formed with a relieving profile.

15. The transverse link of claim 9, wherein the flanges are formed on at least one member selected from the group consisting of the top side and the bottom side of the middle hollow chamber and bent toward the other member.

* * * * *